United States Patent [19]

Feldman

[11] 4,321,838

[45] Mar. 30, 1982

[54] POWER COUPLING FOR A CHAIN SAW

[76] Inventor: Robert I. Feldman, Box 359, Agoura, Calif. 91301

[21] Appl. No.: 66,098

[22] Filed: Aug. 13, 1979

[51] Int. Cl.³ ........................ F16H 1/14; A01D 35/26

[52] U.S. Cl. ........................................ 74/417; 30/122; 30/383; 403/97; 74/606 R; 285/419

[58] Field of Search ................. 74/416, 417, 423, 380, 74/385, 606 R; 30/383, 122; 83/574, 500; 403/97; 173/29, 46; 285/419, 373, 179

[56] References Cited

U.S. PATENT DOCUMENTS

| | | | |
|---|---|---|---|
| 804,105 | 11/1905 | Doolen | 403/97 |
| 884,647 | 4/1908 | Edens | 74/606 R |
| 1,443,579 | 1/1923 | Lippincott | 285/419 |
| 1,561,528 | 11/1925 | Benedict et al. | 74/606 R |
| 1,706,215 | 3/1929 | Davidson | 403/97 |
| 2,235,427 | 3/1941 | Harris | 74/417 X |
| 2,666,460 | 1/1954 | Drain | 30/382 |
| 2,703,928 | 3/1955 | Southwick | 30/500 X |
| 2,706,654 | 4/1955 | Schiavi | 403/97 |
| 2,815,834 | 12/1957 | Mall | 74/385 X |
| 2,910,882 | 11/1959 | Wellaver | 74/380 X |
| 3,463,029 | 8/1969 | Chow | 74/417 X |
| 3,876,015 | 4/1975 | Kizela | 173/29 X |
| 4,188,719 | 2/1980 | Hoff | 30/122 |

FOREIGN PATENT DOCUMENTS

| | | | |
|---|---|---|---|
| 157861 | 7/1954 | Australia | 30/383 |
| 899116 | 5/1972 | Canada | 30/122 |

*Primary Examiner*—Lawrence J. Staab
*Attorney, Agent, or Firm*—Lyon & Lyon

[57] ABSTRACT

A power transmission device adapted to be employed with a chain saw for providing a rotary output in a plurality of directions. The device includes a housing having an input shaft coupled with an output shaft where the input and output shafts are right angles to one another. The housing serves as the support for the driven mechanism and provides mounting flanges about both the input and output shafts. The mounting flange associated with the input shaft cooperates with a chain guideplate to adjustably mount the housing to the chain saw. By simply loosening two screws, the orientation of the output shaft relative to the chain saw can be changed by up to substantially 180 degrees. The mounting flange around the output shaft is designed to allow a 360-degree range in orientation of the driven device about an axis coincident with the axis of the output shaft.

1 Claim, 4 Drawing Figures

POWER COUPLING FOR A CHAIN SAW

BACKGROUND OF THE INVENTION

The present invention is directed to power transmissions and particularly transmissions associated with chain saws.

Chain saws have been developed as a light and powerful means for cutting timber and the like. The engines developed in association with these saws have been found to be of great utility in other areas because of their light and powerful nature. In spite of the advantages of a chain saw engine, one major disadvantage is that the saw is preferably operated in a limited range of orientations. There are two limitations on the attitude which may be taken by such chain saw motors. First, as chain saw driven devices tend to be hand-held rather than fixed, certain limitations on the ability of an individual to hold the saw must be considered. Second, the engine fuel system is frequently incapable of operating at certain attitudes because of fuel leakage, engine starvation or the like.

A disadvantage of any portable engine device is that it is generally expensive to manufacture. Consequently, to have a range of power tools available with adaptable power drives, a substantial investment in engines or drive couplings has been required. Thus, versatility and expense has proven to be a major detriment to the widespread purchase and use of lightweight, sophisticated, portable equipment.

SUMMARY OF THE INVENTION

The present invention is directed to a mechanism for transmitting rotary power derived from a chain saw engine in a plurality of directions for use with a wide variety of power-driven tools. The device includes a means for deriving rotary power from a chain saw. The device combines coupled input and output shafts extending from a housing at right angles to one another with a structural support between the saw and the driven tool. The structural support is provided by the same housing that provides support for the coupled shafts. To establish substantial versatility regarding the direction of power output without sacrificing optimum orientation of the chain saw engine, both ends of the power coupling include mounting flanges which permit changes in output orientation. At the coupling with the chain saw structure, radial splines are employed on each of the mounting surfaces to ensure rigid placement of the power coupling. Fasteners are employed to hold the two mounting surfaces together. These fasteners may be quickly loosened for easy reorientation of the power coupling.

At the output end of the power coupling, a mounting flange is provided with a substantial number of mounting points therein. These mounting points provide a 360-degree range of mounting positions for the driven tool. With the 180-degree variation available at the input end and the 360-degree variation available at the output end, a great number of driven tools can be accommodated without a disadvantageous orientation of the chain saw engine. The attachment arrangement of the input end may also be employed instead of the symetrical mounting points at the output end.

Because of the versatile nature of the power coupling, the preferred embodiment of the present invention has been contemplated for use with a family of tools including a hedge trimmer of the reciprocating type, a generator, a drill chuck, a fluid pump, a reciprocating saw, a grass edger, a brush edger, and an outboard propeller.

Thus, it is an object of the present invention to provide a versatile power coupling for a chain saw. Other and further objects and advantages will appear hereinafter.

DETAILED DESCRIPTION OF THE PREFERRED EMBODIMENT

Figure 1:
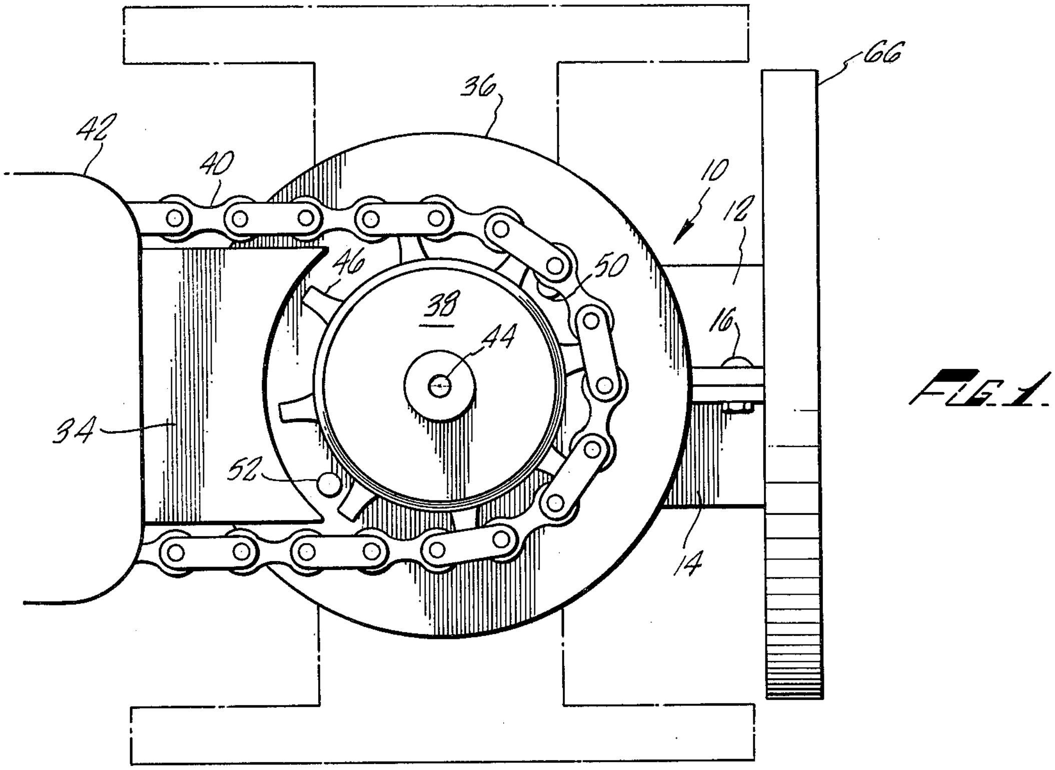
FIG. 1 is a side view of the device of the present invention associated with a chain saw.

Turning in detail to the drawings, a power coupling is disclosed which is adapted to be employed with a chain saw. A housing, generally designated 10, is illustrated as having two mating half cases 12 and 14. The half casings 12 and 14 are bolted together by means of fasteners 16. The half casings 12 and 14 are each integral with an endplate described below. The housing 10 is L-shaped as can best be seen in FIG. 3. Because of the L-shape, rotation of the housing 10 will result in changed orientation of the output.

Located internally to the housing 10 are an input shaft 18 and an output shaft 20. The input shaft 18 is mounted in bearings 22 and 24, while the output shaft 20 is mounted in bearings 26 and 28. Bevel gears 30 and 32 couple the input shaft 18 and output shaft 20 together. Together the input shaft 18 and output shaft 20 thus form a power train means which is capable of transmitting rotational power between the input and the output of the device.

The input to the coupling is provided by a chain guideplate 34, a mounting plate 36 and a rotary drive 38. A chain 40 extends along the chain guideplate 34 and around the rotary drive 38 and is powered by a chain saw 42.

The rotary drive 38 is coupled to one end of the shaft 18 and is held in place by fastener 44. To achieve positive drive between the drive 38 and the input shaft 18, a double-D configuration is employed at the end of the input shaft 18 to associate with a similar hole in the drive 38. Teeth 46 are employed on the drive 38 in association with the chain 40. To fix the housing 10 to the chain saw 42, the mounting plate 36 is rigidly attached to the chain guideplate 34. This may be accomplished by welding, bolting or otherwise similarly fabricating these elements.

The mounting plate 36 is conveniently circular to provide an attachment surface on one side thereof. The attachment surface includes radial splines 48 and threaded holes 50 and 52. The threaded holes 50 and 52 provide attachment points for attachment of the coupling.

The power coupling employs an attachment flange which is also circular and which mates with the mounting plate 36. The attachment flange 54 includes radial splines 56 to mate with the radial splines 48 of the mounting plate 36. Fastener slots 58 and 60 extend through the attachment flange 54. The fastener slots 58 and 60 are slightly less than 180 degrees such that the inside portion of the attachment flange 54 is not separated from the outside portion thereof. By leaving a small amount of material, the degree of rotation available to the attachment flange 54 is substantially 180 degrees, albeit a few degrees less.

The attachment flange 54 is associated with the mounting plate 36 by means of fasteners 62 and 64. There are two fasteners 62 and 64, one for each fastener slot 58 and 60. Attachment points 50 and 52 are provided on the mounting plate 36 for receipt of the fasteners 62 and 64. The fastener slots 58 and 60 are arranged so that the power coupling can be loosened from the mounting plate 36 and rotated as can be seen in phantom in FIG. 1. The reorientation of the power coupling is easily achieved by simply loosening the fasteners 62 and 64 until the radial splines 48 and 56 can pass freely over each other. In this way, the power coupling may be oriented to provide rotary drive vertically up, vertically down, horizontal or any orientation in between without requiring reorientation of the chain saw. Furthermore, at the same time, the mounting capability of the power coupling also provides vertically up, vertically down, horizontal and any orientation in between mounting capability for the driven tool.

Figure 3:
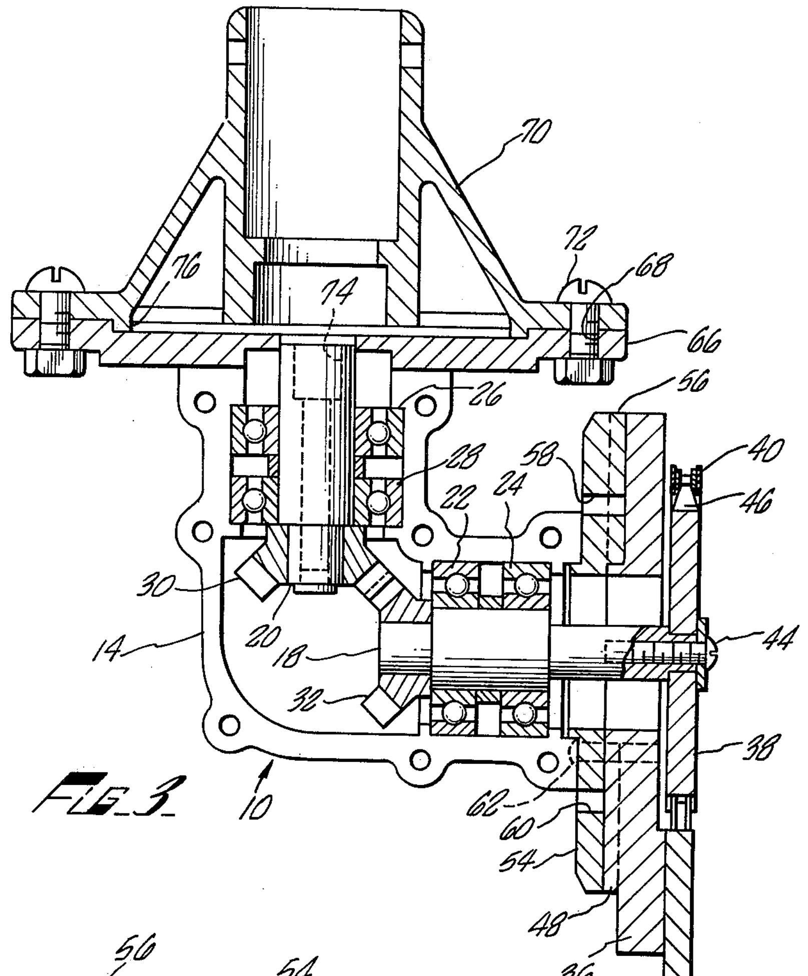
FIG. 3 is a plan view of the present invention taken in cross section along the center line of the coupling and illustrating the coupling associated with a tool bracket.
Figure 4:
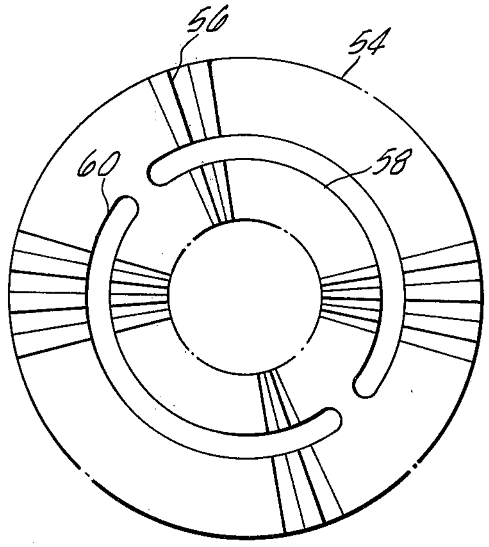
FIG. 4 is an elevation of the attachment flange of the coupling at the input end thereof.

Turning to the output end of the power coupling, a second circular attachment flange is positioned concentrically about a shaft, in this instance the output shaft 20. The attachment flange 66 includes symmetrically positioned attachment points 68 on the attachment surface thereof. By employing a symmetrical pattern, the tools to be associated with the power coupling may be oriented at selected points in a 360-degree range about the axis of the output shaft. In the preferred embodiment, the attachment points 68 are simply drilled holes through which bolts may be positioned as is illustrated in FIG. 3. In FIG. 3, the attachment flange 66 is shown associated with a tool bracket 70 and fasteners 72.

The output shaft 20 includes a double-D socket 74 to mate with a corresponding shaft extension on the driven element. A recessed cylindrical socket is defined by the inner edge of the attachment surface on the flange 66. Because of this shallow cylindrical socket, attachment of tool brackets 70 having an upstanding ridge 76 is facilitated.

Figure 2:
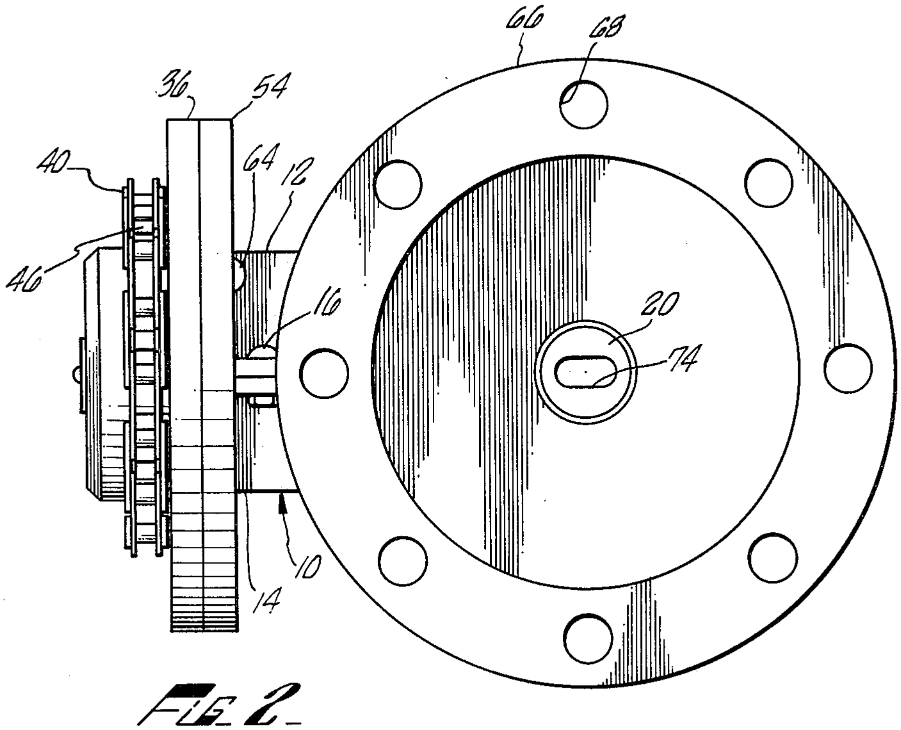
FIG. 2 is a front view of the device of the present invention associated with a chain saw.

As illustrative of the versatile nature of the power coupling, a reciprocating saber saw may be contemplated. The saw would be driven by a cam mechanism and hence the back and forth motion of the saw would be perpendicular to the axis of rotation of the output shaft 20. The saber saw would thus be mounted on the attachment flange 66 in any one of several positions corresponding to the attachment point 68. If it is desirable to cut with the saw straight ahead, the saw would be oriented such that the blade would be pointing down with the flange 66 as seen in FIG. 2. The power coupling device then may be rotated such that the attachment flange 66 is above the power coupling in a position shown at the top of FIG. 1 in phantom. Alternately, if the saw is to cut downwardly, the attachment flange 66 would remain in its position as shown in FIG. 2. With a drill chuck attachment, the drill chuck would rotate about an axis coincident with the axis of the output shaft 20. Under such circumstances, to drill downwardly, the attachment flange 66 would be positioned as shown in phantom in the bottom of FIG. 1. To drill laterally, the attachment flange 66 would be positioned as can be seen in FIG. 2. As mentioned above, a variety of power-driven tools may be incorporated with a chain saw engine through the use of the present invention.

Thus, a power coupling is provided having great versatility for the driving and mounting of a wide variety of power-driven tools with a chain saw engine. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A power coupling for a chain saw, comprising:

a housing, said housing comprising two half casings split longitudinally there through;

power train means for transmitting rotational power through said housing, said power train means including two coupled shafts extending from said housing at right angles to one another;

a first circular attachment flange concentrically positioned on said housing and fixed thereto about the first of said coupled shafts, said first circular attachment flange being integral with one of said two half casings, said first circular attachment flange including attachment points symmetrically positioned about said flange;

a second circular attachment flange concentrically positioned on said housing and fixed thereto about the second of said coupled shafts, said second circular attachment flange being integrally formed with the other of said two half casings and said second circular attachment flange including a first attachment surface having radial splines, said second flange including two fastener slots each extending substantially 180 degrees concentrically on said second flange; and a chain guide plate attachable to a chain saw and having a rotary drive adapted to be powered by a chain and a second attachment surface coaxially arranged with said rotary drive to mate with said first attachment surface for coupling of said rotary drive and the second of said coupled shafts, said second attachment surface having radial spline for interlocking with said radial splines of said first attachment surface and attachment points positioned to meet said fastener slots for retaining fasteners positioned in said slots.

* * * * *